(12) United States Patent
Kobayashi et al.

(10) Patent No.: US 7,723,400 B2
(45) Date of Patent: May 25, 2010

(54) INKJET INK COMPOSITION

(75) Inventors: Yukari Kobayashi, Shizuoka-ken (JP); Hiroshi Hashimoto, Kanagawa (JP); Yuichiro Murayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 815 days.

(21) Appl. No.: 11/527,559

(22) Filed: Sep. 27, 2006

(65) Prior Publication Data

US 2007/0078195 A1  Apr. 5, 2007

(30) Foreign Application Priority Data

Sep. 30, 2005 (JP) .............................. 2005-288871

(51) Int. Cl.
- *C08F 2/50* (2006.01)
- *C08F 2/46* (2006.01)
- *C08J 3/28* (2006.01)
- *C09D 11/00* (2006.01)
- *C09D 11/12* (2006.01)
- *C09D 11/02* (2006.01)

(52) U.S. Cl. .......................... 522/168; 522/71; 522/74; 522/79; 522/81; 522/83; 522/170; 522/78; 522/181; 522/182; 106/31.13; 106/31.6

(58) Field of Classification Search ................ 522/71, 522/74, 81, 83, 79, 168, 170, 178, 181, 182; 106/31.13, 31.6

See application file for complete search history.

(56) References Cited

U.S. PATENT DOCUMENTS

| 3,277,162 A | 10/1966 | Johnson |
| 6,294,592 B1 | 9/2001 | Herrmann et al. |
| 2004/0050292 A1 | 3/2004 | Nakajima et al. |
| 2006/0174799 A1* | 8/2006 | Aoai ........................ 106/31.48 |

FOREIGN PATENT DOCUMENTS

| DE | 197 27 767 A1 | 1/1999 |
| EP | 1 186 638 A1 | 3/2002 |
| EP | 1 477 537 A1 | 5/2004 |
| EP | 1 486 526 A1 | 12/2004 |
| EP | 1 688 468 A1 | 8/2006 |
| JP | 2004-59857 A | 2/2004 |

OTHER PUBLICATIONS

European Search Report dated Dec. 6, 2006.
An Extended European Office Action dated Apr. 30, 2008.

* cited by examiner

*Primary Examiner*—Sanza L McClendon
(74) *Attorney, Agent, or Firm*—Sughrue Mion, PLLC

(57) ABSTRACT

Provided is an inkjet-recording ink composition comprising one or more white pigment(s), one or more polymer dispersant(s), one or more photocurable compound(s), and one or more photoinitiator(s) as its principal components, wherein the polymer dispersant(s) has a sulfonic acid group.

12 Claims, No Drawings

INKJET INK COMPOSITION

CROSS-REFERENCE TO RELATED APPLICATION

This application claims priority under 35 USC 119 from Japanese Patent Application No. 2005-288871, the disclosure of which is incorporated by reference herein.

BACKGROUND OF THE INVENTION

1. Field of the Invention

The present invention relates to an inkjet ink composition, and in particular, to an inkjet ink composition containing a polymeric compound having an acidic group that suppresses sedimentation of white ink and prevents clogging of inkjet nozzles.

2. Description of the Related Art

Essential functionality of white ink is high masking efficiency and tinting strength, because white ink having a lower masking potential, when printed on a colored medium, often results the color of the printed medium appearing through the ink and deterioration in color reproducibility.

Thus, white ink is applied first, and then, other inks of different color are applied thereon. Thus, the amount of white ink used is larger than those of the inks of other colors, and demand for white ink has been constantly growing. Screen printing is often used for application of white ink, but this method has problems in that it is only applicable to printing on flat surfaces and it is difficult to draw fine detail.

On the other hand, inkjet printing ink, which is more convenient and compact than ink in conventional printing methods, and allows printing on three-dimensional media because it is non-contact printing, is becoming more and more popular.

It is possible to overcome the problems of conventional screen printing, and thus, to print images on 3D media and fine detail, by coating with white ink using an inkjet system.

However, the viscosity of the ink used in the inkjet system needs to be low. Accordingly, white inkjet inks have problems of low dispersion stability and easier sedimentation of the pigment. Because the sediment pigment often coagulates, resulting in clogging of inkjet nozzle, blurring of printing image, or uneven printing, there exists an urgent need for a white inkjet ink of low viscosity with superior dispersion stability.

A method of specifying the specific gravity of silica and alumina, and adding an acidic group-containing polymer dispersant was proposed for preparation of white inkjet ink improved in dispersion stability (for example, see Japanese Patent Application Laid-Open (JP-A) No. 2004-59857), but this method is difficult to stabilize and difficult to produce. Thus, white inkjet ink having a favorable dispersion stability is not yet available.

SUMMARY OF THE INVENTION

The present invention has been made in view of the above circumstances, and provides an inkjet ink composition.

A first aspect of the invention provides an inkjet-recording ink composition comprising, as principal components, one or more white pigment(s), one or more polymer dispersant(s), one or more photocurable compound(s), and one or more photoinitiator(s), wherein the polymer dispersant(s) has a sulfonic acid group.

DETAILED DESCRIPTION OF THE INVENTION

Hereinafter, the present invention will be described in detail.

The inkjet ink composition according to the invention (hereinafter referred to also as "the ink composition according to the invention") is an inkjet-recording ink composition comprising, as principal components, one or more white pigment(s), one or more polymer dispersant(s), one or more photocurable compound(s), and one or more photoinitiator(s), wherein the polymer dispersant(s) has a sulfonic acid group. The term "comprising, as principal components, one or more white pigment(s), one or more polymer dispersant(s), one or more photocurable compound(s), and one or more photoinitiator(s)," means that the total content of the white pigment, polymer dispersant, photocurable compound, and photoinitiator is 90 wt % or more in the ink composition according to the invention.

The white pigment favorably used in the invention will be described first.

The white pigment is not particularly limited, and any one of inorganic and organic white pigments and hollow particles commercially available may be used. Alternatively, dispersions of a pigment dispersed in a dispersion medium such as insoluble resin, pigments surface-grafted with a resin, and the like may also be used.

Typical examples of the inorganic white pigments include basic carbonate white lead ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like.

Titanium oxide, which has a lower specific gravity, a higher refractive index, and is chemically and physically more stabile than other inorganic white pigments, is superior in masking power and tinting strength as a pigment and also is superior in durability under acidic, alkaline, and other environments. Thus, the white pigment is preferably titanium oxide.

Titanium oxide is seldom used as it is, untreated, and is generally treated with silica, alumina, zinc, zirconia, or organic matter; and the treated titanium oxides are different in weathering resistance and lipophilicity or hydrophilicity, depending on the processing method. In the invention, use of titanium oxide previously treated with alumina, zinc, zirconia, or basic organic matter is preferable. When mixed-treated titanium oxide is used, the content of the treated titanium oxide by using alumina, zinc, zirconia, or basic organic matter is preferably 50% or more. Other inorganic white pigments (including other than the white pigments described above) can be used as required.

The above organic white pigment, which has a lower specific gravity than those of other inorganic white pigments, can be present stably even in a low-viscosity dispersion. Typical examples of organic white pigments include Shigenox series products (trade name) manufactured by Hakkoru Chemicals, and the like.

Hollow particles exhibit a greater masking efficiency because of light scattering by the voids in the particles and can be present stably in low-viscosity dispersions, because they have a specific gravity lower than those of inorganic white pigments. Inorganic, organic, and mixed inorganic/organic hollow particles are usable. Typical examples of the commercially available hollow particles include Optobead series products (trade name) manufactured by Nissan Chemical Industries Ltd., SX series products (trade name) manufactured by JSR K.K., Microsphere MFL series products (trade name) manufactured by Matsumoto Yushi-Seiyaku Co. Ltd., and the like.

The average diameter of the white pigment particles is preferably 0.05 to 1.0 μm, and it is preferable to select the kinds of the pigment, dispersant and dispersion medium and the dispersion and filtration conditions so that the maximum diameter is 5 μm or less, preferably 1 μm or less. By the particle diameter control, it becomes possible to suppress clogging in head nozzles and retain the favorable ink storage stability, degree of ink transparency and curing sensitivity of the ink.

The content of the white pigment in the ink composition is preferably 5 to 30 wt %, more preferably 10 to 25 wt %, from the points of view of delivering masking efficiency and maintaining stability.

For dispersing the pigment in the invention, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used.

In addition, a solvent may be added for dispersion of the components such as pigment in the invention, or alternatively, cationic polymerizable compounds above, low-molecular weight components, may be added as a dispersion medium without use of a solvent. However, the ink composition according to the invention, which is a radiation-curing ink that cures after application onto a recording medium, preferably contains no solvent. This is because solvent remaining in the cured ink image causes deterioration in solvent resistance and a problem associated with VOC's (Volatile Organic Compounds) derived from the residual solvent.

From the viewpoints above, the use of a photocurable compound, in particular a photocurable compound of the lowest viscosity, as the dispersion medium is preferable from the points of view of dispersibility and increasing the handling efficiency of the ink compositions.

The ink composition according to the invention contains a polymer dispersant. Stabilization of dispersion by steric repulsion is effective in non-aqueous dispersion systems, and use of a polymeric compound as the dispersant (polymer dispersant) often results in high dispersion stability. However, there is a concern that the polymer dispersant may increase the viscosity of the ink composition, and thus, the dispersant is preferably adsorbed onto the pigment efficiently and with a tight adsorption force. However, generally polymer dispersants are less effectively adsorbed and have a weaker adsorption force, and thus may cause problems such as increase in use amount and in the viscosity of the resulting composition.

The polymer dispersant (polymeric compound) for use in the invention has sulfonic acid groups and is adsorbed onto the pigment efficiently by the sulfonic acid groups, leading to increased dispersability of the ink compositions. The sulfonic acid groups in the invention further include a sulfamic acid group containing an amino group. It is possible to obtain the same advantage of increased dispersion of the ink composition when the polymer dispersant used in the invention is a dispersant containing sulfamic acid groups.

A long-chain polyol containing a polar group may be used in introducing the sulfonic acid group during preparation of the polymer dispersant. A polar group-containing long-chain polyol component can be used which contains —$SO_3M$ (wherein, M represents a hydrogen atom, an alkali metal, or ammonium).

In such a case, the skeletal structure of the polyol is, for example, polyester polyol, polyether polyol, polyether ester polyol, polycarbonate polyol, or the like. Typical examples thereof include: dicarboxylic acids having a polar group, such as 5-sodium sulfoisophthalic acid, sodium sulfoterephthalic acid, 2-sodium sulfo-1,4-butanediol, 2-potassium sulfo-1,4-butanediol, sodium bis(2-hydroxyethyl)phosphinate, and sodium sulfosuccinic acid; polyester polyols having a polar group prepared in dehydration condensation of a glycol with other glycols or dicarboxylic acids; polar group-containing polyester polyols prepared in ring-opening polymerization of a lactone such as ε-caprolactone by using an above polar group-containing diol as an initiator; and polar group-containing polyether diols prepared in addition reaction of a polar group-containing diol with an alkyleneoxide such as ethyleneoxide or propyleneoxide and the like.

Examples of the other glycols used in preparation of the polyester polyol include aliphatic glycols such as ethylene glycol, 1,3-propanediol, propylene glycol, neopentylglycol, 1,4-butanediol, 1,5-pentanediol, 1,6-hexanediol, 1,8-octanediol, 1,9-nonanediol, diethylene glycol, and dipropylene glycol; and alicyclic glycols such as cyclohexanediol and cyclohexanedimethanol.

Examples of the other dicarboxylic acids include aliphatic and aromatic dicarboxylic acids such as succinic acid, adipic acid, sebacic acid, azelaic acid, phthalic acid, isophthalic acid, terephthalic acid, and naphthalenedicarboxylic acid.

Favorable examples of the polar group-containing long chain polyols include polyester polyols prepared in dehydration condensation of 5-sodium sulfoisophthalic acid/isophthalic acid/neopentylglycol, polyester polyols prepared in ring-opening polymerization of ε-caprolactone by using 5-potassium sulfoisophthalic acid ethyleneoxide adduct as an initiator, polyether polyols prepared in addition reaction of 2-sodium sulfo-1,4-butanediol with propyleneoxide, and the like. The molecular weight of the polyol is preferably 500 to 5,000 and more preferably 600 to 2,500. Introduction of polar groups into a compound with the polyol results in narrower distribution of the polar groups in the compound molecule, and hence improvement in dispersibility and dispersion stability. Increase in the molecular weight leads to decrease in the amount of the polar groups capable of introducing in the compound, and consequently in deterioration in dispersibility, while increase in the number of the polar groups leads to association among them and consequently in increase in the viscosity of the solution and deterioration in dispersibility.

The polymer dispersant for use in the invention may also be prepared by addition polymerization of the polar group-containing long chain polyol with an organic diisocyanate and a diol.

Examples of the organic diisocyanate compounds include aromatic diisocyanates such as 2,4-tolylene diisocyanate, 2,6-tolylene diisocyanate, xylene-1,4-diisocyanate, xylene-1,3-diisocyanate, 4-4'-diphenylmethane diisocyanate, 4,4-diphenylether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxydiphenyl-4,4'-diisocyanate; aliphatic diisocyanates such as tetramethylene diisocyanate, hexamethylene diisocyanate, and lysine diisocyanate; alicyclic diisocyanates such as isophorone diisocyanate, hydrogenated tolylene diisocyanates, and hydrogenated diphenylmethane diisocyanates; and the like. The diisocyanate compound is preferably contained in the polymer dispersant in an amount in the range of 50 wt % or less, more preferably in the range of 40 wt % or less.

Examples of the diols include long chain diols, i.e., polyalkylene glycols such as polypropylene glycol, polyethylene glycol, and polytetramethylene glycol; polyether polyols such as polyethyleneoxide or polypropyleneoxide adducts with a cyclic diol such as bisphenol A, bisphenol A hydride, bisphenol S, or bisphenol P; and the like. Bisphenol A propyleneoxide adducts, bisphenol A ethyleneoxide adducts, bisphenol A hydride ethyleneoxide adducts, and bisphenol A hydride propyleneoxide are also usable.

The weight-average molecular weight of the polymer dispersant for use in the invention is preferably 200,000 or less and more preferably 100,000 or less. A polymer dispersant for use in the invention having a weight-average molecular weight of 200,000 or more may lead to decrease in the solubility in solvent and deterioration in dispersibility.

In addition, a short-chain diol may be used in combination with the long chain diol. Typical examples of the short-chain diols include aliphatic and alicyclic diols such as ethylene glycol, 1,3-propylene diol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, cyclohexane-1,4-diol and cyclohexane-1,4-dimethanol; and the like.

Typical examples of the polymer dispersants for use in the invention include the following compound:

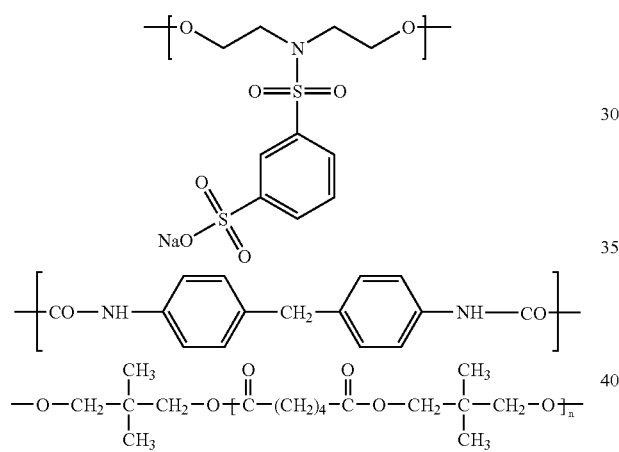

-continued

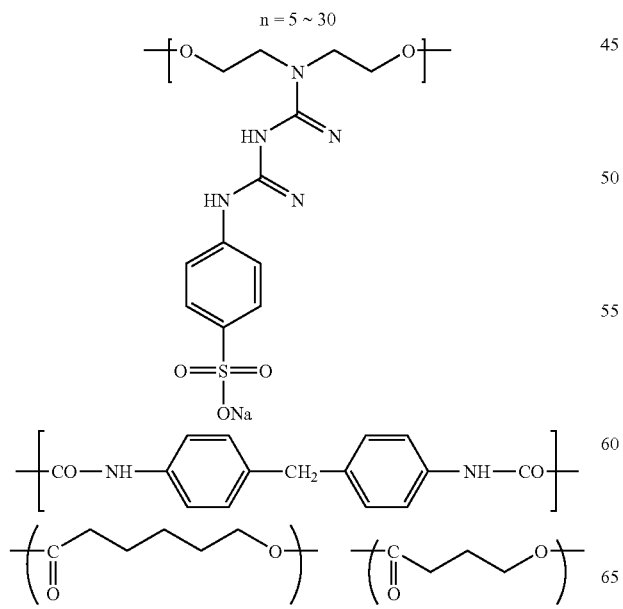

-continued

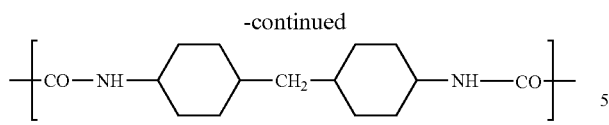

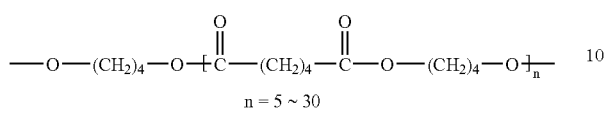
n = 5 ~ 30

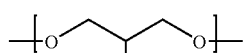

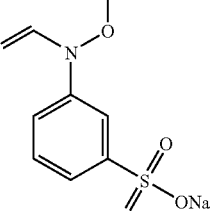

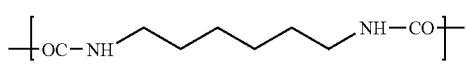

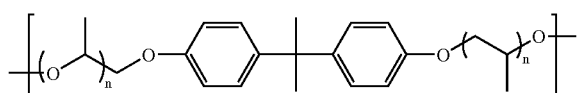

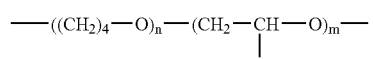

n = 5 ~ 30
m = 5 ~ 30

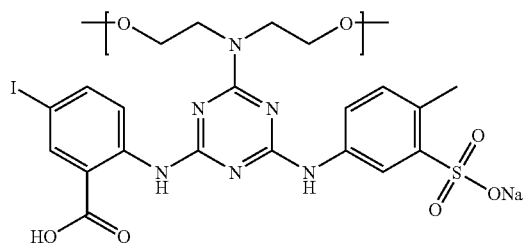

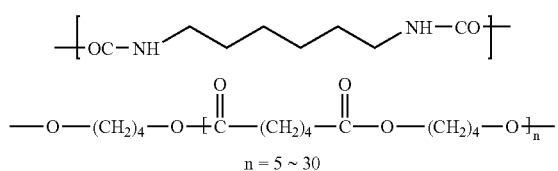

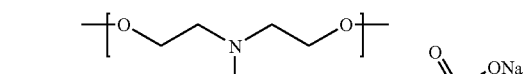
n = 5 ~ 30

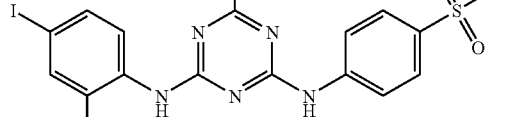

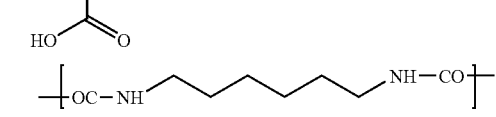

n = 5 ~ 30
m = 5 ~ 30

-continued

An ethylenic unsaturated monomer having a polar group may be used in introducing sulfonic acid groups. Examples of the acidic group-containing ethylenic unsaturated monomers include commercially available vinylsulfonate salts, allylsulfonate salts, p-styrenesulfonate salts, 4-sulfobutylmethacrylate salts, methacryloxybenzenesulfonate salts, allyloxybenzenesulfonate salts, and the like. In addition, the acidic groups may be introduced by using Antocs MS-60 or Antocs MS-2N manufactured by Japan emulsifier Co., Ltd., or Ramtel S-180 or Ramtel S-180A manufactured by Kao Corporation, which is generally used as a reactive emulsifier.

Examples of the monomers copolymerizable with the sulfonate salt group-containing monomer include ethylenic unsaturated carboxylic ester monomers, aromatic vinyl monomers, ethylenic unsaturated nitrile monomers, alkyl vinyl ether monomers, vinyl ester monomers, ethylenic unsaturated polyvalent carboxylic anhydrides, and the like.

Examples of the ethylenic unsaturated carboxylic ester monomers include alkyl (meth)acrylate monomers, alkoxyalkyl (meth)acrylate monomers, and the like.

In the invention, "(meth)acryl" or "(meth)acrylate" means "acryl" and "methacryl" or "acrylate" and "methacrylate".

Typical examples of the alkyl (meth)acrylate monomers include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, 2-ethylhexyl (meth)acrylate, lauryl (meth)acrylate, stearyl (meth)acrylate, and cyclohexyl (meth)acrylate, and the like.

Among them, methyl (meth)acrylate is preferable.

The alkyl group in the alkyl (meth)acrylate monomer may be an alkyl group having further substituent and is preferably an aralkyl group. Typical examples of such compounds include benzyl (meth)acrylate, phenoxyethyl (meth)acrylate, phenoxypolyethylene glycol (meth)acrylate, nonylphenol ethyleneoxide adduct (meth)acrylate, and the like. Among them, benzyl (meth)acrylate and phenoxyethyl (meth)acrylate are preferable.

Examples of the alkoxyalkyl (meth)acrylate monomers include methoxyethyl (meth)acrylate, butoxyethyl (meth)acrylate, and the like. Examples of the unsaturated carboxylic ester monomer include glycidyl (meth)acrylate and the like.

Examples of the aromatic vinyl monomers include styrene, α-methylstyrene, vinyltoluene, monochlorostyrene, p-methylstyrene, hydroxymethylstyrene, and the like.

Examples of the ethylenic unsaturated nitrile monomers include acrylonitrile, methacrylonitrile, 2-ethylpropenenitrile, 2-propylpropenenitrile, 2-chloropropenenitrile, 2-butenenitrile, and the like.

Examples of the alkyl vinylether monomers include allyl glycidylether, methyl vinylether, ethyl vinylether, isobutyl vinylether, n-butyl vinylether, 2-ethylhexyl vinylether, n-octyl vinylether, lauryl vinylether, cetyl vinylether, stearyl vinylether and the like.

Examples of the vinyl ester monomers include vinyl formate, vinyl acetate, vinyl propionate, isopropenyl acetate, vinyl valerate, vinyl caprate, vinyl laurate, vinyl stearate, vinyl benzoate, vinyl versatate, vinyl pivalate, and the like.

Examples of the ethylenic unsaturated polyvalent carboxylic anhydrides include maleic anhydride, itaconic anhydride, and the like.

These monomers copolymerizable with the sulfonate salt group-containing monomer may be used alone or in combination of two or more. Among them, ethylenic unsaturated carboxylic acid monomers are preferable, and alkyl (meth) acrylate monomers are still more preferable.

The copolymer containing the (meth)acrylate monomer above as a copolymerization component may have —COOM (M represents an alkali metal or ammonium salt) or a hydroxyl group as the condensation-polymerization group. The group —COOM is introduced, for example, in addition reaction of —COOM into an acrylic copolymer obtained by copolymerization of a sulfonate salt group-containing monomer and a monomer copolymerizable therewith.

Alternatively, a copolymerizable polar group-containing compound may be copolymerized with a sulfonate salt group-containing monomer and a monomer copolymerizable therewith. The COOM-containing copolymerizable compound is, for example, a salt of (meth)acrylic acid or maleic acid.

Examples of the hydroxyl group-containing copolymerizable monomers include hydroxyalkyl (meth)acrylates such as hydroxyethyl (meth)acrylate, hydroxypropyl (meth)acrylate, polyethylene glycol mono(meth)acrylate, polypropylene glycol mono(meth)acrylate, polyethylene glycol polypropylene glycol mono(meth)acrylate, glycerol mono(meth)acrylate, and 3-chloro-2-hydroxypropyl (meth)acrylate; vinyl ethers such as hydroxyethyl vinylether, hydroxypropyl vinylether, and hydroxybutyl vinylether; (meth)allyl ethers such as hydroxyethyl mono(meth)allylether, hydroxypropyl mono (meth)allylether, hydroxybutyl mono(meth)allylether, diethylene glycol mono(meth)allylether, dipropylene glycol mono (meth)allylether, glycerin mono(meth)allylether, and 3-chloro-2-hydroxypropyl (meth)allylether; (meth)allyl alcohol, and the like. The vinyl alcohol monomer may be introduced by copolymerizing vinyl acetate and saponifying the copolymer with a caustic alkali in solvent.

In introducing sulfonic acid groups, Cl—$(CH_2)_n$—$SO_3M$, Cl—$(CH_2)_n$—$OSO_3M$ or the like may be allowed to react with a hydroxyl group-containing polymer such as polyvinyl alcohol.

In the Formula above, M is the same as M described above.

The addition amount of the polymer dispersant for use in the invention is preferably in the range of 1 to 10 wt % and more preferably in the range of 1 to 4 wt % with respect to the pigment. When the addition amount of the polymer dispersant is in the range of 1 to 10 wt % with respect to the pigment, the polymer dispersant is adsorbed more on the pigment and dispersed better, leaving the viscosity of the ink composition unincreased by the polymeric compound, preventing increase in the surface tension of the ink composition by action of surfactant, and eliminating inkjet ejection troubles.

In addition, the polymer dispersant for use in the invention should be soluble in the dispersion medium, i.e., photocurable compound. When used as it is not dissolved, the polymer dispersant is insufficiently adsorbed on the pigment, occasionally causing insufficient dispersion.

The ink composition according to the invention contains a photocurable compound. The photocurable compound for use in the invention is not particularly limited, if it is a photocurable group-containing compound known in the art, and any one of known photocurable compounds may be used without restriction, independently of whether it is a monomer, an oligomer, or a polymer. The photocurable compounds may be used alone or in combination of two or more, for the purpose of adjusting the reaction rate, ink physical properties, physical properties of the cured film, and others.

The photocurable compound used is preferably a radical or cationic polymerizable compound.

The radical polymerizable compound is a compound having an ethylenic unsaturated bond capable of radical polymerization, and may be in any form as long as a molecule includes at least one ethylenic unsaturated bond capable of radical polymerization, including a chemical form such as a monomer, an oligomer, and a polymer. One type of such radical polymerizable compound may be used, or, in order to improve a purposed property, two or more types thereof may be used at any ratio. Moreover, polyflnctional compounds having two or more functional groups are more preferred than monofunctional compounds. A combined use of two or more types of polyftinctional compounds is further preferred in controlling the performance such as reactivity and physical properties.

In the ink composition a radical polymerizable compound containing (meth)acrylate is favorably used as the radical polymerizable compound according to the invention. Examples of the (meth)acrylates include the following compounds:

Typical examples of monoflinctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bomyl (meth)acrylate, isobomyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylates, alkoxyethyl (meth)acrylates, 2-(2-methoxyethoxy)ethyl (meth)acrylate, 2-(2-butoxyethoxy)ethyl (meth)acrylate, 2,2,2-tetrafluoroethyl (meth) acrylate, 1H, 1H,2H,2H-perfluorodecyl (meth)acrylate, 4-butylphenyl (meth)acrylate, phenyl (meth)acrylate, 2,4,5-tetramethyllphenyl (meth)acrylate, 4-chlorophenyl (meth) acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth) acrylates, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth) acrylate, diethylaaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethyleneoxide monomethylether (meth)acrylate, oligo ethyleneoxide monomethylether (meth)acrylates, polyethyleneoxide (meth)acrylate, oligo ethyleneoxide (meth)acrylates, oligo ethyleneoxide monoalkylether (meth)acrylates, polyethyleneoxide monoalkylether (meth)acrylates, dipropylene glycol (meth) acrylate, polypropyleneoxide monoalkylether (meth)acrylates, oligo propyleneoxide monoalkylether (meth)acrylates, 2-methacryloyloxyethyl succinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth) acrylate, 2-hydroxy-3-phenoxypropyl (meth)acrylate, ethyleneoxide-modified phenol (meth)acrylates, ethyleneoxide-modified cresol (meth)acrylates, ethyleneoxide-modified nonylphenol (meth)acrylates, polyethyleneoxide-modified nonylphenol (meth)acrylates, ethyleneoxide-modified-2-ethylhexyl (meth)acrylates, carbitol (meth)acrylate, oligoester (meth)acrylates, epoxy (meth)acrylates, urethane (meth) acrylates, methyl (meth)acrylate, n-butyl (meth)acrylate, 2-ethylhexyl (meth)acrylate, lauryl (meth)acrylate, allyl (meth)acrylate, glycidyl (meth)acrylate, benzyl (meth)acrylate, dimethylaminomethyl (meth)acrylate, and the like.

Typical examples of bifuinctional (meth)acrylates include 1,6-hexanediol di(meth)acrylate, 1,10-decanediol di(meth)acrylate, neopentylglycol di(meth)acrylate, 2,4-dimethyl-1,5-pentanediol di(meth)acrylate, butylethylpropanediol (meth)acrylate, ethoxylated cyclohexane methanol di(meth)acrylates, polyethylene glycol di(meth)acrylate, oligo ethylene glycol di(meth)acrylates, ethylene glycol di(meth)acrylate, 2-ethyl-2-butyl-butanediol di(meth)acrylate, neopentyl hydroxypivalate glycol di(meth)acrylate, ethyleneoxide-modified bisphenol A di(meth)acrylates, bisphenol F polyethoxy di(meth)acrylates, polypropylene glycol di(meth) acrylate, oligo propylene glycol di(meth)acrylates, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylates, tricyclodecane di(meth)acrylate, diethylene glycol di(meth)acrylate, triethylene glycol di(meth)acrylate, tetraethylene glycol di(meth) acrylate, polyethylene glycol di(meth)acrylate, 1,6-hexanediol di(meth)acrylate, ethylene glycol di(meth)acrylate, triethylene glycol di(meth)acrylate, polyethylene glycol di(meth)acrylate, polypropylene glycol di(meth)acrylate, and the like.

Typical examples of trifunctional (meth)acrylates include trimethylolpropane tri(meth)acrylate, trimethylolethane tri(meth)acrylate, alkyleneoxide-modified trimethylolpropane tri(meth)acrylates, pentaerythritol tri(meth)acrylate, dipentaerythritol tri(meth)acrylate, trimethylolpropane tri((meth)acryloyloxypropyl)ether, isocyanuric acid alkyleneoxide-modified tri(meth)acrylates, dipentaerythritol propionate tri (meth)acrylate, tri((meth)acryloyloxyethyl)isocyanurate, hydroxypivalaldehyde-modified dimethylolpropane tri (meth)acrylates, sorbitol tri(meth)acrylate, propoxylated trimethylolpropane tri(meth)acrylate, ethoxylated glycerin triacrylate, trimethylolethane tri(meth)acrylate, trimethylolpropane tri(meth)acrylate, and the like.

Typical examples of tetrafunctional (meth)acrylates include pentaerythritol tetra(meth)acrylate, sorbitol tetra (meth)acrylate, ditrimethyrollpropane tetra(meth)acrylate, dipentaerythritol propionate tetra(meth)acrylate, ethoxylated pentaerythritol tetra(meth)acrylate, dipentaerythritol tetra (meth)acrylate, tetramethylolmethane tetra(meth)acrylate, and the like.

Typical examples of pentafunctional (meth)acrylates include sorbitol penta(meth)acrylate, dipentaerythritol penta (meth)acrylate, and the like.

Typical examples of hexafunctional (meth)acrylates include dipentaerythritol hexa(meth)acrylate, sorbitol hexa (meth)acrylate, phosphazene alkyleneoxide-modified hexa (meth)acrylates, captolactone-modified dipentaerythritol hexa(meth)acrylates, and the like.

In the invention, the radical polymerizable compound preferably contains (a) at least one trifunctional or higher (meth) acrylate and at least one compound selected from (b) a monofunctional (meth)acrylate and a bif-inctional (meth)acrylate, for adjustment of viscosity, crosslinking density, and physical properties (strength, adhesiveness, and others) after curing. In such a case, the blending ratio (molar ratio) of (a):(b) is preferably 15:85 to 40:60 and more preferably 20:80 to 50:50.

Examples of the radical polymerizable compound other than those listed above include unsaturated carboxylic acids such as acrylic acid, methacrylic acid, itaconic acid, crotonic acid, isocrotonic acid, and maleic acid and the salts, esters, urethanes, amides and anhydrides thereof; acrylonitrile, styrene, as well as various unsaturated polyesters, unsaturated polyethers, unsaturated polyamides, unsaturated urethanes, and the like. Specific examples thereof include acrylic acid derivatives such as bis(4-acryloxypolyethoxyphenyl)propane and diacetone acrylamide; methacrylic acid derivatives such as 2,2-bis(4-methacryloxypolyethoxyphenyl)propane; and allyl derivatives such as allyl glycidylether, diallyl phthalate, and triallyl trimellitate; and the like; and more specific examples include commercially available radical-polymerizable or crosslinkable monomers, oligomers and polymers known in the art, such as those described in "Crosslinking Agent Handbook" (Shinzo Yamashita Ed., 1981, Taiseisha Co., Ltd.), "UV-EB Curing Handbook (raw materials)" (Kiyoshi Kato Ed., Kobunshi Kankokai (1985)), "Application and Market of UV-EB Curing Technology" (RadTech Japan Ed., p. 79 (1989), CMC Publishing), "Polyester Resin Handbook" (Eiichiro Takiyama, Nihon Kogyo Shimbun (1988)).

The content of the radical polymerizable compound in the ink composition is preferably 5 to 95 wt %, more preferably 10 to 90 wt %, and particularly preferably 50 to 90 wt %, with respect to the total amount of the ink composition.

The cationic polymerizable compound may be selected arbitrarily, for the purpose of adjustment of the polymerizability and the physical properties of ink composition. Oxirane compounds, oxetane compounds, vinylethers, styrenes, and the like are preferable from the viewpoints of polymerization rate and application. These compounds may be used alone or in combination of two or more. Hereinafter, examples of these compounds are described.

[Oxirane Compound]

The oxirane compounds include aromatic epoxides, alicyclic epoxides, and the like.

Examples of the aromatic epoxides include di- or polyglycidyl ethers prepared by allowing a polyvalent phenol having at least one aromatic ring or the alkyleneoxide adduct thereof to react with epichlorohydrin; and examples thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. The alkyleneoxide is ethyleneoxide, propyleneoxide, or the like.

Examples of the alicyclic epoxide include compounds including cyclohexeneoxide or cyclopenteneoxide obtained by epoxidazing a compound having at least one cycloalkane ring such as a cyclohexene or cyclopentene ring with a proper oxidizer such as hydrogen peroxide, or peroxy acid.

Examples of the aliphatic epoxide include diglycidylether or polyglycidylether of aliphatic polyalcohol or its alkyleneoxide adduct. Typical examples thereof include diglycidylether of alkyleneglycol such as diglycidylether of ethyleneglycol, diglycidylether of propyleneglycol, diglycidylether of 1,6-hexanediol, polyglycidylether of polyalcohol such as diglycidylether or triglycidylether of glycerin or its alkyleneoxide adduct, diglycidylether of polyalkyleneglycol such as diglycicylether of polyethyleneglycol or its alkyleneoxide adduct, diglycidylether of polypropyleneglycol or its alkyleneoxide adduct. Here, examples of the alkyleneoxide include ethyleneoxide and propyleneoxide.

Among the epoxy compounds, from the viewpoint of rapid curability, preferred are the aromatic epoxide and the alicyclic epoxide, in particular, the alicyclic epoxide.

Oxirane compounds having fewer functional groups, which also allow adjustment of solubility and viscosity as described above, are preferable.

Typical examples of the oxirane compounds for use in the invention include the followings: Examples of monofunctional epoxide include as phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcyclohexeneoxide, 3-acryloyloxymethylcyclohexeneoxide, 3-vinylcylcohexeneoxide, and the like.

Examples of multifunctional epoxides include bisphenol A diglycidylether, bisphenol F diglycidylether, bisphenol S diglycidylether, brominated bisphenol A diglvcidylethers, brominated bisphenol F diglycidylethers, brominated bisphenol S diglycidylethers, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl) adipate, vinylcylcohexeneoxide, 4-vinyl epoxycyclohexane, bis(3,4-epoxy-6-methylcyclohexylmethyl) adipate, 3,4-epoxy-6-methylcyclohexyl-3,4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), dioctyl epoxyhexahydrophthalate, di-2-ethylhexyl epoxyhexahydrophthalate, 1,4-butanediol diglycidylether, 1,6-hexanediol diglycidylether, glycerin triglycidylether, trimethylolpropane triglycidylether, polyethylene glycol diglycidylether, polypropylene glycol diglycidylethers, 1,1,3-tetradecadiene dioxide, limonene dioxide, 1,2,7,8-diepoxyoctane, 1,2,5,6-diepoxycyclooctane, and the like.

[Oxetane Compound]

The oxetane compound according to the invention is a compound having an oxetane ring, and any one of known oxetane compounds such as those described in JP-A Nos. 2001-220526, 2001-310937, and 2003-341217 may be used.

The oxetane ring-containing compound for use in the ink composition according to the invention is preferably a compound having 1 to 4 oxetane rings in the structure, and among them, use of a compound having one oxetane ring is preferable from the viewpoints of the viscosity and tackiness of the ink composition. It becomes possible to keep the viscosity of the ink composition in the range favorable for handling and make the cured ink more adhesive to the recording medium by using such a compound.

Typical examples of the monofunctional oxetane compounds for use in the invention include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenylether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl) ether, ethyldiethylene glycol (3-ethyl-3-oxetanylmethyl) ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl)ether, and the like.

Examples of the multifunctional oxetanes include 3,7-bis (3-oxetanyl)-5-oxa-nonane, 3,3'-[1,3-(2-methylenyl)propandiyl bis(oxymethylene)]bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecandiyldimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ethers, caprolactone-modified dipentaerythritol pentakis(3-ethyl-3-oxetanylmethyl)ethers, ditrimethyrollpropane tetrakis(3-ethyl-3-oxetanylmethyl)ether, EO-modified bisphenol A bis(3-ethyl-3-oxetanylmethyl) ethers, PO-modified bisphenol A bis(3-ethyl-3-oxetanylmethyl)ethers, EO-modified hydrogenated bisphenol A bis(3-ethyl-3-oxetanylmethyl)ethers, PO-modified hydrogenated bisphenol A bis(3-ethyl-3-oxetanylmethyl)ethers, and EO-modified bisphenol F (3-ethyl-3-oxetanylmethyl)ethers, and the like.

[Vinyl Ethers]

Examples of monofunctional vinyl ethers among the vinylethers above include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, phenoxypolyethylene glycol vinylether, and the like.

Examples of multifuinctional vinyl ethers include divinyl ethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers; multifunctional vinylethers such as trimethylolethane trivinylether, trimethylolpropane trivinylether, ditrimethylolpropane tetravinylether, glycerin trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinylether, ethyleneoxide adducts of dipentaerythritol hexavinylether, propyleneoxide adducts of dipentaerythritol hexavinylether, and the like.

[Styrenes]

Typical examples of the styrenes include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, 4-t-butoxystyrene, and the like.

In the invention, the ink composition preferably contains at least one compound selected from the oxirane compounds and the oxetane compounds above as the cationic polymerizable compound, from the viewpoint of curing speed. In such a case, the blending ratio (molar ratio) of oxirane compound: oxetane compound is preferably 90:10 to 10:90 and more preferably 70:30 to 30:70. Alternatively, use of an oxetane compound and styrene at a blending ratio of 90:10 to 50:50 is also preferable.

The content of the cationic polymerizable compound in the ink composition is preferably 5 to 95 wt %, more preferably 10 to 90 wt %, and particularly preferably 50 to 90 wt %, with respect to the total amount of the ink composition.

The ink composition according to the invention contains a photoinitiator. Any one of known compounds that can harden the photocurable compound may be used as the photoinitiator. A radical or cationic polymerization initiator may be used as the photoinitiator, and is preferably used in combination with a radical or cationic polymerizable compound.

The ink composition according to the invention preferably contains a photo acid generator as the photoinitiator.

The photo acid generator (hereinafter, referred to also as "photocationic polymerization initiator") is a compound that generates an acid by irradiation of activated light or active radiation ray and initiates cationic polymerization, and is used as it is selected properly from known compounds and the mixture thereof.

The photocationic polymerization initiators including those described below and may be used alone or in combination of two or more. The content of the photocationic polymerization initiator in the ink composition is preferably in the range of 0.1 to 20 wt % and more preferably 0.5 wt % to 10 wt %.

A photocationic polymerization initiator content of 0.1% or less may lead to decrease in the amount of the acid generated and thus to insufficient curing efficiency, while a photocationic polymerization initiator content of 20% or more may cause problems of the brittleness of cured product and acid generation by remaining initiator.

Examples of the photocationic polymerization initiators according to the invention include diazonium salts, phosphonium salts, sulfonium salts, iodonium salts, imide sulfonates, oxime sulfonates, diazo disulfones, disulfones, and o-nitrobenzylsulfonates.

Alternatively, polymeric compounds containing a photocationic polymerization initiator or a group equivalent thereto on its main or side chain, such as those described in U.S. Pat. No. 3,849,137, Germany Patent No. 3914407, JP-A Nos. 63-26653, 55-164824, 62-69263, 63-146038, 63-163452, 62-153853, and 63-146029, and others, may also be used.

The compounds that generate an acid by light irradiation described in U.S. Pat. No. 3,779,778, and EP Patent No. 126,712 are also used favorably.

[Other Components]

Hereinafter, various additives that may be added as need to the ink composition according to the invention will be described.

[Polymerization Inhibitor]

It is preferable in the invention to use a polymerization inhibitor for preventing polymerization other than cationic polymerization, to make the polymerization by the photocationic polymerization initiator proceed more efficiently. The suitable polymerization inhibitor is a compound selected from the group consisting of phenolic hydroxyl group-containing compounds and quinones, N-oxide compounds, piperidin-1-oxyl free radical compounds, pyrrolidin-1-oxyl free radical compounds, N-nitroso phenyl hydroxylamines, and cationic dyes. Favorable examples of the polymerization inhibitors include hydroquinone, p-methoxyphenol, di-t-butyl-p-cresol, pyrogallol, resorcinol, catechol, t-butylcatechol, hydroquinone, benzoquinone, 4,4-thiobis(3-methyl-6-t-butylphenol), 2,2'-methylene-bis(4-methyl-6-t-butylphenol), 2,2,6,6-tetramethylpiperidine and the derivatives thereof, di-t-butyl nitroxide, 2,2,6,6-tetramethylpiperidine-N-oxide and the derivatives thereof, piperidin-1-oxyl free radical, 2,2,6,6-tetramethylpiperidin-1-oxyl free radical, 4-oxo-2,2,6,6-tetramethylpiperidin-1-oxyl free radical, 4-hydroxy-2,2,6,6-tetramethylpiperidin-1-oxyl free radical, 4-acetamido-2,2,6,6-tetramethylpiperidin-1-oxyl free radical, 4-maleimido-2,2,6,6-tetramethylpiperidin-1-oxyl free radical, 4-phosphonoxy-2,2,6,6-tetramethylpiperidin-1-oxyl free radical, 3-carboxy-2,2,5,5-tetramethylpyrrolidin-1-oxyl free radical, N-nitrosophenylhydroxylamine cerous salt, N-nitrosophenylhydroxylamine aluminum salt, crystal violet, methyl violet, ethyl violet, Victoria Pure Blue BOH, and the like. The amount of the polymerization inhibitor added is preferably 0.01 to 5 wt %, with respect to the mass of the ink composition.

(Ultraviolet Absorber)

An ultraviolet absorber may be added to the ink composition of the present invention from the viewpoint of improving the weather resistance and preventing discoloration of the obtained image.

Examples of the ultraviolet absorber include benzotriazol compounds described in JP-A Nos. 58-185677, 61-190537, 2-782, 5-197075 and 9-34057; benzophenone compounds described in JP-A Nos. 46-2784 and 05-194483, and U.S. Pat. No. 3,214,463; cinnamic acid compounds described in Japanese Patent Application Publication (JP-B) Nos. 48-30492 and 56-21141, and JP-A No. 10-88106; triazine compounds described in JP-A Nos. 4-298503, 8-53427, 8-239368, and 10-182621, and Japanese National Phase Publication No.

8-5012911, compounds described in Research Disclosure No. 24239; compounds which absorb ultraviolet rays to generate fluorescence, such as stilbene and benzoxazol compounds; and so-called fluorescent brightening agents.

The addition amount may vary accordingly to applications, but is usually, approximately 0.01 to 10 wt % in the ink composition.

(Antioxidant)

An antioxidant may be added to the ink composition of the present invention in order to improve the stability. Examples of the anti-oxidant include ones described in European Patent Publication Nos. 223739, 309401, 309402, 310551, 310552, and 459416, German Patent Publication No. 3435443, JP-A Nos. 54-48535, 62-262047, 63-113536, and 63-163351, 02-262654, 02-71262, 03-121449, 05-61166, 05-119449, U.S. Pat. Nos. 4,814,262, and 4,980,275.

The addition amount may vary accordingly to applications, but is usually, approximately 0.001 to 1 wt % in the ink composition.

(Solvent)

In order to improve the adhesiveness onto the recording medium, it is also effective to add trace amount of organic solvent into the ink composition of the present invention.

Examples of the solvent include: ketone solvents such as acetone, methylethyl ketone, diethyl ketone, cyclohexanone; alcohol solvents such as methanol, ethanol, 2-propanol, 1-propanol, 1-butanol, and tert-butanol; chlorinated solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycolether solvents such as ethylene glycol monomethylether and ethylene glycol dimethylether.

In this case, the effective addition is within a range not causing problems such as solvent resistance and VOC. The amount thereof is preferably within a range of 0.1 to 5 wt %, more preferably 0.1 to 3 wt % with respect to the total ink composition.

(Polymeric Compound)

Various other polymeric compounds for adjustment of film physical properties may be added additionally to the ink composition according to the invention. Examples of the other polymeric compounds include styrene polymers, acrylic polymers, cyclic ether polymers, polyvinylbutyral resins, polyurethane resins, polyamide resins, polyester resins, epoxy resins, phenol resins, polycarbonate resins, polyvinylbutyral resins, polyvinyl formal resins, shellac, vinyl resins, acrylic resins, rubber-based resins, waxes, other natural resins, and the like. These polymeric compounds may be used in combination of two or more. Among them, copolymers of a styrene monomer, an acrylic monomer, and a cyclic ether are preferable. In addition, copolymers containing a "cyclic ether group-containing monomer" or a "vinylether group-containing monomer" as its structural unit are also used favorable as the copolymerization component of polymer binder.

The addition amount may vary according to applications, but is usually, approximately 0.01 to 10.0 wt % in the ink composition.

(Surfactant)

In order to adjust the surface tension and to improve discharging property of the inkjet-recording ink, a surfactant may be added to the ink composition of the present invention. Examples of the surfactant include those described in JP-A Nos. 62-173463 and 62-183457. Examples thereof include: anionic surfactants such as dialkyl sulfosuccinates, alkyl naphthalenesulfonates, and fatty acid salts; nonionic surfactants such as polyoxyethylene alkyl ethers, polyoxyethylene alkyl aryl ethers, acetylenic glycols, and polyoxyethylene/polyoxypropyrene block copolymers; and cationic surfactants such as alkylamine salts, and quaternary ammonium salts. An organic fluoro compound may be used instead of the surfactant above. The organic fluoro compound is preferably hydrophobic. Examples of the organic fluoro compound include fluorine-containing surfactants, oily fluorine-containing compounds (such as fluorine oil), and fluorine-containing solid resins (such as ethylene tetrafluoride resin). The organic fluoro compounds are described in JP-B No. 57-9053 (column 8 to 17), and JP-A No. 62-135826.

The addition amount may vary according to applications, but is usually, approximately 0.001 to 5.0 wt % in the ink composition.

In addition, leveling addition agents, matting agents, waxes for adjusting the film property, and a tackifier which does not inhibit the polymerization to improve the adhesiveness onto the recording medium such as polyolefine or PET may be added to the inkjet recording ink of the present invention as necessary.

Specific example of the tackifier include cohesive polymers of high molecular weight described in JP-A No. 2001-49200, page 5 to 6 (for example, a copolymer comprising an ester of (meth)acrylate and alcohol including an alkyl group having 1 to 20 carbon atoms, an ester of (meth)acrylate and alicyclic alcohol having 3 to 14 carbon atoms, and an ester of (meth)acrylate and aromatic alcohol having 6 to 14 carbon atoms), and tackifying resins of low molecular weight having a polymerizable unsaturated bond.

Considering the ejection efficiency when applied to inkjet-recording, the ink composition according to the invention preferably has an ink viscosity of 50 mPa·s or less, more preferably 30 mPa·s or less, at the ejection temperature, and thus, it is preferable to adjust and determine the ink composition properly so that the viscosity thereof falls in the range above. The viscosity of the ink composition at 25° C. is 10 to 300 mPa·s and preferably 10 to 100 mPa·s. By setting the viscosity high at room temperature, it become possible to prevent penetration of the ink into recording medium even when a porous recording medium is used, reduce the amounts of uncured monomer and odor, suppress ink bleeding after an ink droplet is ejected, and consequently improve the quality of the resulting image. An ink viscosity of lower than 10 mPa·s at 25° C. is not effective in preventing the ink bleeding, while an ink viscosity of more than 500 mPa·s leads to a problem in ink delivery.

The surface tension of the ink composition of the present invention is preferably 20 to 30 mN/m, more preferably 23 to 28 mN/m. If recording is performed onto various recording media such as polyolefine, PET, a coated paper, and an uncoated paper, the surface tension is preferably 20 mN/m or more from the viewpoint of bleeding and permeation, and preferably 30 mN/m or less from the viewpoint of wettability.

The ink composition according to the invention can be used favorably as an ink for inkjet-recording. The inkjet-recording process is not particularly limited, and may be, for example, an electric charge-control method of ejecting ink by electrostatic attraction, a drop-on-demand method (pressure pulse method) of using the vibrational pressure of piezoelectric element, an acoustic inkjet method of ejecting ink by converting electrical signals into acoustic beams, irradiating the beams on ink, and generating an acoustic radiation pressure in the ink, a thermal inkjet method of forming air bubbles by heating ink and using the pressure thus generated, or the like. The inkjet-recording processes include those of ejecting a so-called photo ink, which is lower in concentration, multiple times in smaller volumes, improving image quality by using multiple different inks that are substantially the same in color tone and concentration, and using a transparent and colorless ink. Among them, the ink composition according to the invention is favorable as the ink for printing by a drop-on-demand process (pressure pulse process) using an piezoelectric element. Exemplary aspects of the invention are listed below.

<1> An inkjet-recording ink composition containing one or more white pigment(s), one or more polymer dispersant(s), one or more photocurable compound(s), and one or more photoinitiator(s) as its principal components, wherein the polymer dispersant(s) has a sulfonic acid group.

<2> The inkjet ink composition of <1>, wherein the photocurable compound(s) contains a cationic polymerizable compound at least containing an oxirane or oxetane group or a radical polymerizable compound at least containing an acryl or methacryl group.

<3> The inkjet ink composition of <1>, wherein the average diameter of the white pigment particles is 0.05 to 1.0 µm.

<4> The inkjet ink composition of <1>, wherein the sulfonic acid group in the polymer dispersant(s) includes a sulfamine group.

<5> The inkjet ink composition of <1>, wherein the polymer dispersant(s) contains a long-chain polar group-containing polyol component containing —$SO_3M$.

<6> The inkjet ink composition of <1>, wherein the weight-average molecular weight of the polymer dispersant(s) is 200,000 or less.

<7> The inkjet ink composition of <1>, wherein the amount of the polymer dispersant(s) added is 1 to 10 wt % with respect to the pigment(s).

<8> The inkjet ink composition of <2>, wherein the radical polymerizable compound contains (a) at least one trifunctional or higher (meth)acrylate; and (b) at least one compound selected from monofunctional and bifunctional (meth)acrylate; and the mixing molar ratio (a):(b) is from 15:85 to 40:60.

<9> The inkjet ink composition of <2>, wherein the cationic polymerizable compound contains an oxetane compound having one to four oxetane rings in its structure.

<10> The inkjet ink composition of <1>, wherein the photoinitiator is a photo acid generator.

<11> The inkjet ink composition of <10>, wherein the photo acid generator is contained in the ink composition in an amount of 0.1 to 20 wt %.

<12> The inkjet ink composition of <1>, further comprising a polymerization inhibitor.

<13> The inkjet ink composition of <1>, wherein the surface tension of the ink composition is 20 to 30 mN/m.

EXAMPLES

Hereinafter, the present invention will be described specifically with reference to Examples, but it should be understood that the invention is not restricted by these Examples.

Example 1

Preparation of Polymeric Compound (Polymer Dispersant) 1 Solution 25 wt % of dimethylester 5-sulfoisophthalate Na salt and 75 wt % of an ester glycol (ESG; manufactured by Mitsubishi Gas Chemical Company) were esterified at 240° C. under nitrogen stream, to give a sulfonic acid Na-containing polyester.

Then, 2.5 wt % of the sulfonic acid Na-containing polyester and 13.4 wt % of BPX1000 (manufactured by Asahi Denka Corporation) were dissolved in 70.0 wt % of cyclohexanone in a container equipped with a stirrer and previously substituted with nitrogen; di-n-dibutyltin laurate was added to a concentration of 60 ppm; and the mixture was dissolved additionally for 15 minutes.

Then, 14.1 wt % of 4,4-diphenylmethane diisocyanate was added thereto, and the mixture was allowed to react at 90° C. for 6 hours under heat, to give a polymeric compound 1 solution.

[Preparation of Ink Composition]

A pigment, a photoinitiator, a sensitization colorant, three photocurable compounds, and the polymeric compound 1 solution at the following blending ratio were dispersed in a dispersing machine, to give an ink composition.

Pigment [alumina-treated titanium oxide (particle surface alumina treatment rate: 60%)] 15.0 wt %

Caprolactone-modified dipentaerythritol hexaacrylate (DPCA60, manufactured by SARTOMER Inc.; polymerizable compound) 56.3 wt %

1,6-Hexanediol diacrylate (HDDA, manufactured by Daicel-UCB Co. Ltd., polymerizable compound) 15.0 wt %

Mixture of 1-hydroxy-cyclohexyl-phenylketone and bis(2,6-dimethoxybenzoyl)-2,4,4-trimethyl-pentylphosphine oxide (manufactured by Ciba Specialty Chemicals; photopolymerization initiator) 11.5 wt %

Polymeric compound: polymeric compound 1 solution above 1.2 wt %

Oxygen scavenger (ST-1, manufactured by Chem First Chemicals) 1.0 wt %

Example 2

Preparation of Polymeric Compound (Polymer Dispersant) 2 Solution 25 wt % of dimethylester 5-sulfoisophthalate Na salt and 75 wt % of 2,2-diethyl-1,3-propanediol were esterified at 240° C. under nitrogen stream, to give a sulfonic acid Na-containing polyester.

Then, 2.5 wt % of the sulfonic acid Na-containing polyester and 13.4 wt % of Placcel 210 (manufactured by Daicel) were dissolved in 70.0 wt % of cyclohexanone in a container equipped with a stirrer and previously substituted with nitrogen; di-n-dibutyltin laurate was added to a concentration of 60 ppm; and the mixture was dissolved additionally for 15 minutes.

Further, 14.1 wt % of hexamethylene diisocyanate was added thereto, and the mixture was allowed to react at 90° C. for 6 hours under heat, to give a polymeric compound 2 solution.

An ink composition was prepared in a similar manner to Example 1, except that the polymeric compound 1 solution was replaced with the polymeric compound 2 solution.

Comparative Example 1

Preparation of Polymeric Compound (Polymer Dispersant) 3 Solution 2.5 wt % of a polyester polyol prepared from adipic acid and 2,2-dimethyl-1,3-propanediol and 13.4 wt % of BPX1000 (manufactured by Asahi Denka) were dissolved in 70.0 wt % of cyclohexanone, di-n-dibutyltin laurate was added to a concentration of 60 ppm and dissolved therein additionally for 15 minutes. Then, 14.1 wt % of 4,4-diphenylmethane diisocyanate was added thereto, and the mixture was allowed to react at 90° C. for 6 hours under heat, to give a polymeric compound 3 solution not including acid group.

Further, an ink composition was prepared in a similar manner to Example 1, except that the polymeric compound 1 solution was replaced with the polymeric compound 3 solution.

Comparative Example 2

Preparation of Polymeric Compound (Polymer Dispersant) 4 Solution 1.0 wt % of dimethylolpropionic acid and 14.9 wt % of BPX1000 (manufactured by Asahi Denka) were dissolved in 70.0 wt % of cyclohexanone, and di-n-dibutyltin laurate was added thereto to a concentration of 60 ppm and dissolved therein additionally for 15 minutes. 14.1 wt % of 4,4-diphenylmethane diisocyanate was then added thereto, and the mixture was allowed to react at 90° C. for 6 hours under heat, to give a polymeric compound 4 solution including carboxyl group.

An ink composition was prepared then in a similar manner to Example 1, except that the polymeric compound 1 solution was replaced with the polymeric compound 4 solution.

The viscosity, dispersibility, sedimentation tendency, redispersion ability, masking ability, ejection stability, curing ability, adhesiveness, and weathering resistance of each of the ink compositions obtained in Examples 1 and 2 and Comparative Examples 1 and 2 were determined according to the following methods.

[Evaluation of Ink Composition]

(1. Viscosity)

The viscosity of each ink composition was determined at 40° C. by using a type-E viscometer (manufactured by Toki Sangyo Co., Ltd.) and evaluated according to the following criteria:

A: Less than 30 mPa·s
B: 30 mPa·s up to 100 mPa·s
C: 100 mPa·s or more (a level causing problem in ink ejection) The results are summarized in Table 1.

(2. Dispersibility)

Each dispersion was studied by using an optical microscope and evaluated according to the following criteria:

A: No particles of 1 μm or more.
B: Some particles of 1 μm or more. The results are summarized in Table 1.

(3. Sedimentation Tendency)

Each dispersion was left in a 50 ml glass container at room temperature for a month, and sedimentation of the pigment was evaluated by visual observation.

The sedimentation tendency was ranked in three tiers, 3, 2, and 1, from the lowest sedimentation to the highest. The results are summarized in Table 1.

(4. Redispersion Ability)

Each dispersion was centrifuged forcibly in a centrifugal separator (rotational frequency: 5000 rpm, 30 minutes) and then redispersed while agitated, and the redispersion efficiency was evaluated. It was ranked in three tiers, 3, 2, and 1 from the most favorable.

The results are summarized in Table 1.

(5. Ejection Stability)

After printing for 60 minutes by using each ink in an inkjet printer, ink ejection was observed, and an ink composition consistently ejected evenly was ranked A, that with some satellite droplets B, and that causing nozzle clogging C. The results are summarized in Table 1.

The ink composition obtained was ejected on art paper in an inkjet printer (printing density: 300 dpi, ejection frequency: 4 kHz, nozzle number: 64), and the image formed was exposed to light from a deep-UV lamp (SP-7, trade name, manufactured by Ushio Inc.) at an intensity of 15 mJ/cm$^2$, to give a printed sample. The sample was evaluated 10 minutes after printing in the following tests.

(6. Curing Ability)

The printed surface was evaluated in a tack-free test. Cured films not tacky to the touch were ranked A; slightly tacky B; and significantly tacky C. The results are summarized in Table 1. The A-ranked samples were reevaluated similarly to above except that the irradiation energy of the Deep UV lamp was changed to 7.5 mJ/cm$^2$, and a sample thus obtained that was not tacky was ranked S.

(7. Adhesiveness)

The cured film was cut vertically and horizontally multiple times with a cutter knife, and adhesive tape was bonded to the surface and then peeled off. The cured film remaining on the base material was observed visually. A cured film without peeling off was ranked A; that with partially peeled off film B; that with significant peeled off film C; and that unevaluatable because of insufficient curing, D. The results are summarized in Table 1.

(8. Masking Ability)

The ink composition was coated on a black paper with a barcoater, and the masking ability of the coated film after curing was evaluated by visual observation. The masking ability was ranked in three tiers, 3, 2, and 1, from the most favorable. The results are summarized in Table 1.

(9. Light Stability)

The photographic paper carrying an image was irradiated with a xenon light (100,000 lux) for 3 days in a weathering meter (Atlas C.165), and the image densities before and after xenon irradiation were determined by using a reflection densitometer (X-Rite 310TR), to give a residual colorant ratio. The reflection density used for measurement was fixed 1.0. The results were grouped into three ranks: a residual colorant ratio of 80% or more, A; less than 80%, B; and less than 70%, C. The results are summarized in Table 1.

TABLE 1

|  | Viscosity | Dispersibility | Sedimentation tendancy | Redispersion ability | Ejection stability | Curing ability | Adhesiveness | Masking ability | Weathering resistance |
|---|---|---|---|---|---|---|---|---|---|
| Example 1 | A | A | 3 | 3 | A | A | A | 3 | A |
| Example 2 | A | A | 3 | 3 | A | A | A | 3 | A |
| Comparative Example 1 | B | B | 1 | 1 | C | A | B | 1 | A |
| Comparative Example 2 | A | B | 2 | 2 | B | A | A | 3 | A |

As shown in Table 1, the ink compositions of Examples by using a polymeric compound having sulfonic acid groups (polymer dispersion) were superior in low-viscosity, favorable dispersibility, sedimentation resistance, and redispersion ability and also in ink stability. In addition, the coated films obtained therefrom were superior in adhesiveness and masking ability, while retaining their favorable curing ability and weathering resistance. The results indicate that the ink compositions of the Examples are superior in ink stability and can give favorable images superior in curing ability and adhesiveness to the recording medium. Further, such ink compositions seldom cause clogging, and supply of the inks to the apparatus is stabilized. In contrast, the ink compositions of the Comparative Examples were inferior in ink stability (dispersion ability, sedimentation resistance, or redispersion ability) and could not satisfy the requirements for ejection stability.

The invention provides a white inkjet ink composition superior in ink dispersion stability and resistant to sedimentation of its pigment and thus to nozzle clogging.

As apparent from the description above, it is necessary to raise the adsorption efficiency of the dispersant on the pigment and make the pigment dispersed consistently in the photocurable compound for preventing nozzle clogging by improving ink dispersion stability and preventing sedimentation of the pigment.

The invention is characterized by introducing a particular acidic group on the dispersant, thus improving the adsorption efficiency of the dispersant on the pigment and consequently improving the ink dispersion stability; and as a result, it is possible to prevent sedimentation of the pigment and thus prevent nozzle clogging.

After intensive studies, the present inventors have succeeded to raise the adsorption efficiency of the dispersant to the pigment and improve the dispersion stability of the ink further by introducing a sulfonic acid group onto a dispersant, and thus to prevent sedimentation of the pigment and consequently nozzle clogging. The inventors also have found that it was thus possible to obtain an ink composition that was less viscous and cause no clogging in inkjet nozzles even after storage for an extended period of time or repetition temperature change, and completed the invention.

According to the invention, it is possible to provide a white inkjet ink composition that prevents nozzle clogging, by improving dispersion stability of the ink and preventing sedimentation of the pigment. The inkjet ink composition superior in dispersion stability prevents nozzle clogging and gives on a recording medium (printing paper or the like) a character or image superior in adhesiveness to the recording medium.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet-recording ink composition, comprising, as principal components, one or more white pigment(s), one or more polymer dispersant(s), one or more photocurable compound(s), and one or more photoinitiator(s), wherein the polymer dispersant(s) contain a sulfonic acid group, and
    the polymer dispersant(s) are prepared by a polymerization reaction using a long-chain polyol as one component, the long chain polyol containing —$SO_3M$ as a polar group, wherein M represents a hydrogen atom, an alkali metal, or ammonium.

2. The inkjet-recording ink composition of claim 1, wherein the photocurable compound(s) contains: a cationic polymerizable compound at least containing an oxirane or oxetane group; or a radical polymerizable compound at least containing an acryl or methacryl group.

3. The inkjet-recording ink composition of claim 1, wherein the average diameter of the white pigment particles is 0.05 to 1.0 μm.

4. The inkjet-recording ink composition of claim 1, wherein the sulfonic acid group in the polymer dispersant(s) includes a sulfamine group.

5. The inkjet-recording ink composition of claim 1, wherein the weight-average molecular weight of the polymer dispersant(s) is 200,000 or less.

6. The inkjet-recording ink composition of claim 1, wherein the amount of the polymer dispersant(s) added is 1 to 10 wt % with respect to the pigment(s).

7. The inkjet-recording ink composition of claim 2, wherein the radical polymerizable compound contains: (a) at least one trifunctional or higher (meth)acrylate; and (b) at least one compound selected from monofunctional and bifunctional (meth)acrylates; and the mixing molar ratio (a):(b) is from 15:85 to 40:60.

8. The inkjet-recording ink composition of claim 2, wherein the cationic polymerizable compound contains an oxetane compound having one to four oxetane rings in its structure.

9. The inkjet-recording ink composition of claim 1, wherein the photoinitiator(s) is/are a photo acid generator.

10. The inkjet-recording ink composition of claim 9, wherein the photo acid generator is contained in the ink composition in an amount of 0.1 to 20 wt %.

11. The inkjet-recording ink composition of claim 1, further comprising a polymerization inhibitor.

12. The inkjet-recording ink composition of claim 1, wherein the surface tension of the ink composition is 20 to 30 mN/in.

* * * * *